M. W. LYMAN.

Improvement in Animal Traps.

No. 124,838. Patented March 19, 1872.

WITNESSES
N. C. Gridley
F. F. Warner

INVENTOR
Myron W. Lyman

124,838

UNITED STATES PATENT OFFICE.

MYRON W. LYMAN, OF CHICAGO, ILLINOIS.

IMPROVEMENT IN ANIMAL-TRAPS.

Specification forming part of Letters Patent No. 124,838, dated March 19, 1872.

SPECIFICATION.

*To whom it may concern:*

Be it known that I, MYRON W. LYMAN, of Chicago, in the county of Cook and State of Illinois, have invented certain new and useful Improvements in Animal-Traps, of which the following is a full, clear, and exact description, which will enable others skilled in the art to which my invention appertains to make and use the same, reference being had to the accompanying drawing forming a part hereof, in which—

Figure 1:
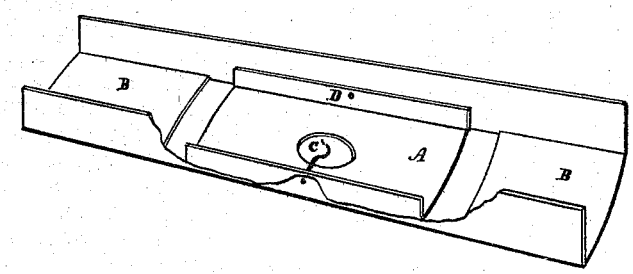
Figure 2:
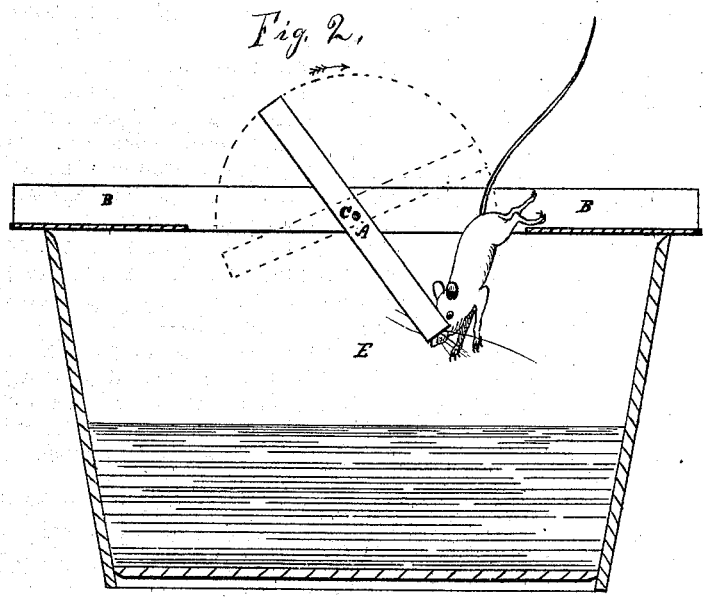

Figure 1 represents a perspective view of my improved animal-trap; and Fig. 2, a side elevation thereof, showing the trap when placed over a suitable receptacle for confining the animals after they are caught.

My invention relates to that class of animal-traps which have the bait arranged over a tilting-table, so that as the animals advance toward the bait the table is tilted by their weight, and they fall through the trap into any suitable receptacle for confining or drowning them. My invention consists in certain novel features in the construction of the trap, hereafter more fully described.

In the drawing, A represents the tilting-table, and B the bridge, to which it is pivoted. C is the bait-hook, which also forms one of the pivots upon which the table A turns, and D is its other pivot. E represents any convenient receptacle over which the trap may be placed, as shown, so that the animals in seeking the bait will fall through the trap into said receptacle and be unable to escape therefrom. If desired, this receptacle may be partly filled with water, so that the animals will be more effectually prevented from escaping, or drowned therein.

It will be observed from reference to Fig. 1, that there is a considerable space between the table A and bridge B. This space is such that the animal will be compelled, in the act of stepping upon the table A, and whether with one or both forward feet, to throw the bulk of his weight so far from the bridge B and toward the bait that it will be unable to recover its balance and retain its position on the bridge, but fall through the trap into the receptacle E, as shown in Fig. 2, the table A yielding to the touch of the animal as the latter endeavors to reach the bait. In other devices of this class the space between the tilting-table and the bridge is only sufficient to allow the table to tilt, and the latter is so near the bridge that the animal is able to retreat and escape after detecting the yielding movement of the table. It will also be observed that the table A is pivoted above its center of gravity, so that it will automatically set itself, and that it turns about a fixed bait without disturbing the latter, and without allowing the animal to reach the bait. If preferred, the opening in the center of the table A may be dispensed with, provided there is sufficient space left between the bait and the table to admit of the movement of the latter without disturbing the former.

Having thus described the nature and object, construction and operation of my invention, what I claim as new, and desire to secure by Letters Patent, is—

In combination, the tilting-table A, pivoted above its center of gravity, bridge B, and bait-hook C, forming one or both pivots of the table A, all constructed and arranged substantially as and for the purpose shown and described.

The foregoing specification of my invention signed by me this 11th day March, A. D. 1871.

MYRON W. LYMAN.

Witnesses:
L. J. FARWELL,
N. C. GRIDLEY.